UNITED STATES PATENT OFFICE.

THOMAS ARCHER, OF NEW YORK, N. Y.

IMPROVEMENT IN THE PROCESSES OF ORNAMENTING HOLLOW ARTICLES OF GLASS.

Specification forming part of Letters Patent No. 152,059, dated June 16, 1874; application filed October 10, 1873.

*To all whom it may concern:*

Be it known that I, THOMAS ARCHER, of the city, county, and State of New York, have invented a Process for Ornamenting Hollow Articles of Glass, of which the following is a specification:

This invention relates to a certain process for producing designs or ornaments on the inner or concave surface of a hollow article of glass or other vitreous material by first printing on said surface with suitable ink the designs required, and then closing the article at both ends, and finally admitting to its interior the fumes of fluoric acid, so that the effect produced by such designs or ornaments is improved, the cost of such etching lessened, and the usual acid-chamber dispensed with, and the etching produced with more ease and facility than heretofore; and, further, the designs or ornaments created are protected from injury, and the full strength of the glass preserved.

In carrying out my invention, I take a hollow article of glass, such as glass globes, shades for lamps, or for statuary or other articles, vases, and so forth, and print, stamp, or paint on its inner concave surface a design with printers' ink or other suitable material, leaving those portions of the surface of the glass exposed which are to be acted on by the etching-liquid. The vessel is then closed at its end or ends, and the fumes of fluoric acid introduced into the interior of said vessel, so that the etching is effected with comparative ease and facility, and the cost of producing such designs or ornaments is materially lessened, since the usual acid-chamber for inclosing the vessel to be etched is dispensed with; and, further, the fumes of the fluoric acid can also be used for grinding the interior or concave surface of the glass after the ornaments have been finished and protected by printers' ink.

The designs or ornaments, after being cut or produced, are developed and prominently brought out by placing pebbles, bits of metal, or sand into the interior of the article, and revolved therein, so that said material will produce a dull surface on those parts not touched or eaten away by the acid.

By ornamenting the inner concave surface of the glass the outer surface is left entirely intact; and since, in blown articles of glass, such as globes or shades, the outer surface is always the best and strongest portion of the glass, in an article ornamented according to my invention the full strength and beauty of the glass is preserved. Furthermore, the ornaments or designs produced on the inner concave surface of a hollow article of glass are not exposed to dust or other impurities, like those produced on the outer convex surface of such articles, and they are less liable to become injured.

I claim as my invention—

The within-described process of producing designs on the inner surface of a hollow article made of glass or other vitreous material by first printing on said surface with suitable ink the designs required, then covering the opening or openings so as to form a closed chamber, and finally admitting to the interior thereof the fumes of fluoric acid, as set forth.

THOMAS ARCHER.

Witnesses:
J. M. DRISCOLL,
W. HAUFF.